3,043,794
NOVOLAK-DIISOCYANATE SYNTHETIC RESIN, SOLUTIONS THEREOF, AND METHOD OF MAKING LAMINATES

Leonard Feiler, Brooklyn, and Arnold H. Gruben, Bronx, N.Y., and Howard H. Leiner, New Brunswick, N.J., assignors, by mesne assignments, to Sinclair Research, Inc., New York, N.Y., a corporation of Delaware
No Drawing. Filed Jan. 22, 1958, Ser. No. 710,408
17 Claims. (Cl. 260—33.6)

This invention relates to synthetic resins which when dissolved in a suitable solvent are useful for laminating purposes, particularly in insulating varnishes of the type which are widely employed in the electrical arts. This invention also relates to the insulating varnishes themselves and laminated products made therefrom.

Insulating varnishes conventionally can be a solution of a resin in a volatile solvent, and they are employed for the protection of fibrous insulation, such as paper, glass, fabrics and wood, from mechanical damage and moisture, improvement of electrical insulating properties, bonding the layers of laminating materials, imparting surface finish and the like. Two general methods are in use for treating electrical coils, windings and insulating parts with insulating varnishes, the first of which involves vacuum impregnation and the second of which involves dipping.

For an insulating varnish to be a satisfactory one, it is necessary that the articles prepared therefrom have certain properties. In the first place, the articles when paper, glass, cloth and the like, should have satisfactory flexural strength and resistance to water absorption. Also, the articles should be characterized by a low power factor, low dielectric constant and low loss factor. Also, the insulating varnish containing the resin should have a relatively long pot life, so that a batch of the varnish can be prepared and used before the resin present therein has polymerized to an undue extent.

In accordance with the present invention, there are provided new synthetic resins which can be used to make insulating varnishes of a highly satisfactory type. The varnishes possess pot life to an exceptional extent. In addition the articles made therefrom possess an exceptionally low power factor, low dielectric constant and low loss factor, and at the same time they exhibit satisfactory flexural strength and resistance to water absorption.

The resins of this invention are ones which have been manufactured by reacting a suitable diisocyanate with a novolak resin of a particular kind. The novolak resin is one prepared from formaldehyde and an alkyl phenol prepared by the alkylation of phenol with a monoolefin hydrocarbon which has been separated from polymer gasoline and which contains from 7 to 9 carbon atoms, or a mixture of such monoolefin hydrocarbons.

The polymerization of gaseous olefins to form polymer gasoline is well known in the art and it can be carried out thermally, if desired. Generally, however, the polymer gasoline is manufactured by appropriate catalytic treatment of a gas which is rich in $C_3$ or $C_4$ monoolefin hydrocarbons, or mixtures thereof. Among the catalysts which can suitably be utilized in the catalytic process are acids such as sulfuric acid, phosphoric acid and dihydroxyfluoroboric acid; metal phosphates; natural hydrosilicates and synthetic silica-alumina composites; and halides, particularly Friedel-Crafts-type metal halides. After the polymer gasoline has been formed, the $C_7$, $C_8$, or $C_9$ monoolefin hydrocarbon, or a suitable mixture thereof, can be separated therefrom by conventional means, such as fractionation. The monoolefin hydrocarbon can then be utilized to alkylate phenol in accordance with procedures which have been well worked out in the art, as by the use of a catalyst such as sulfuric acid, hydrogen fluoride, aluminum chloride, boron trifluoride and so forth.

The art is also well aware of methods for the manufacture of novolak resins by reacting formaldehyde, including sources of formaldehyde, such as para-formaldehyde, trioxane or methylal, and alkylphenols. Novolak resins are essentially fusible linear condensation polymers of the alkyl phenol and formaldehyde. They are generally prepared by reacting the alkylphenol and formaldehyde in a molar ratio of the order of one to one using an acid catalyst, such as hydrochloric acid, sulfuric acid, phosphoric acid or the like, but they can also be prepared with the aid of a basic catalyst, such as sodium hydroxide, potassium hydroxide, ammonia or various amines.

In order to prepare the resin of the present invention, the novolak is prepared using from 0.75 to 1.5 moles of the alkyl phenol per mole of formaldehyde, the alkylphenol being entirely monoalkyl phenol or a mixture of monoalkyl phenol and up to 35 mole percent of dialkyl phenol, based upon the moles of monoalkyl phenol and dialkyl phenol, and is further reacted with an alkaryl diisocyanate, with the result that a resin of increased molecular weight is formed. When this reaction is carried out, from 0.4 to 0.6 mole of the diisocyanate is generally employed per mole of combined alkyl phenol present in the novolak resin and the reaction is generally carried out with the reactants dissolved in an aromatic hydrocarbon solvent, such as benzene, toluene, one of the xylenes, ethylbenzene, isopropylbenzene or a mixture thereof, at a temperature of from about 50° C. to about 175° C. The reaction is terminated while the resin is still soluble in the solvent. A wide variety of alkaryl diisocyanates can be utilized for the purpose of preparing the resin of this invention, among them being diphenylmethane-4,4'-diisocyanate, bi-tolyl-methane-5,5'-diisocyanate and 3,3'-bi-tolylene-4,4'-diisocyanate. Preferably, however, the diisocyanate used is 2,4-tolylene diisocyanate.

The insulating varnish of this invention is a solution of the alkylphenol-formaldehyde-diisocyanate resin prepared as just described in a hydrocarbon solvent, generally an aromatic hydrocarbon solvent, particularly benzene, toluene, a xylene, ethylbenzene, cumene or a mixture thereof. As a rule, the insulating varnish will contain from about 20 to about 40 percent by weight of the resin, although somewhat lower and higher percentages can also be used.

The insulating varnish is used in accordance with the general techniques which have heretofore been employed in the application of insulating varnishes. Thus, plies of the base material (paper, glass wool, wire gauze or the like) can be first treated with the varnish, as by dipping, the solvent evaporated, and then the plies of the base material coated with the resin subjected to heat and pressure to cure the resin and form the laminate.

The following examples illustrate the invention. In the examples the term "moles" signifies gram moles.

EXAMPLE I

A sample of para-heptylphenol is first prepared by alkylating phenol with mixed heptenes obtained by the fractionation of polymer gasoline. In order to do this, 2.2 moles of phenol is admixed with boron trifluoride etherate as a catalyst and the mixture is heated to approximately 65° C. The heating is stopped, and two moles of the mixed heptenes is added slowly, while maintaining the temperature of the reaction mass within the range from about 65° C. to about 75° C. The amount of boron trifluoride etherate used is approximately 5 percent by weight, based upon the weight of the phenol and mixed heptenes used. After the mixed heptenes have been added, the reaction mixture is held at approximately 85° C. for approximately 2.5 hours. To separate the catalyst, 1000 cc. of hot water is added, and the resulting water layer is separated. The non-aqueous layer is then washed several times with water. To obtain the alkylated phenol, the residue or non-aqueous layer is subjected to vacuum distillation. At 55° C. and at an absolute pressure of 5 centimeters of mercury, water is distilled off. At 120° C. to 130° C. at an absolute pressure of three centimeters of mercury, the unreacted phenol is distilled off. At a temperature of approximately 165° C. and at an absolute pressure of three centimeters of mercury, the heptylphenol is distilled off. The yield of heptylphenol is 85 to 90 percent, and the heptylphenol is made up of para-heptylphenol and ortho-heptylphenol, the latter being present in relatively small amount.

In order to prepare a heptylphenol-formaldehyde novolak, 1.0 mole (192.0 grams) of the heptylphenol prepared as described is reacted with 1.0 mole (31.6 grams) of paraformaldehyde of 95 weight percent purity, in the presence of toluene using 12.1 grams of 37 percent by weight hydrochloric acid as a catalyst. The total amount of toluene used is sufficient to bring the final reaction mixture to approximately 60 percent by weight non-volatiles.

In carrying out the reaction, the heptylphenol, paraformaldehyde and hydrochloric acid are charged to a two-liter glass flask equipped with resin apparatus, namely, a stirrer, a reflux condenser, a thermometer, a gas inlet tube and a Dean-Stark trap. Gentle heating is applied and as the reaction mixture heats up an exothermic reaction commences. At the end of 20 minutes, the temperature has reached 76° C. and the heat is turned off and ½ of the total amount of toluene is added. At the end of a further period of thirty minutes, the exothermic reaction has subsided, the temperature then being approximately 70° C., and the heat is applied again and the remainder of the toluene added. At the end of a further period of 45 minutes, the temperature has reached 95° C., and the reaction mixture begins to reflux. At this time, the passage of nitrogen gas into the reaction mixture is commenced. The reaction mixture is then refluxed for a further period of 24 minutes, during which time the temperature of the reaction mixture gradually rises to approximately 120° C. With the aid of the Dean-Stark trap, the theoretical amount of water (1.0 mole) is removed, and the heat and flow of nitrogen are turned off. The mixture is then permitted to cool to approximately 50° C., water is added and the mixture is agitated and washed until it is neutral. The novolak resin solution in toluene is separated from the wash water in a separatory funnel, vacuum distilled to a pot temperature of 150° C. at an absolute pressure of two centimeters of mercury in order to remove the toluene, and finally the resin is poured out of the flask and permitted to cool.

In order to prepare a laminating varnish from the heptyl phenol-formaldehyde novolak made as just described, 1.0 mole (174.0 grams) of 2,4-tolyene diisocyanate is charged into a three-liter stainless steel kettle equipped with resin apparatus. The diisocyanate is diluted with a 1:1 by weight mixture of toluene and xylene in the amount of approximately 174 grams and heated to reflux (approximately 116° C.). This step requires about thirty minutes. 204 grams of the heptylphenol-formaldehyde novolak prepared as described dissolved in an equal weight of a 1:1 by volume mixture of toluene and xylene is then added gradually over the next ten minutes. The application of heat is continued, and at the end of the ten minute period the temperature of the reaction mixture has risen to about 134° C. The reaction mixture is then refluxed for a period of 90 minutes, following which a similar addition of a solution of 204 grams of the heptylphenol-formaldehyde novolak in the form of a 50 percent by weight mixture in 1:1 toluene: xylene is made. Refluxing is continued until the viscosity of the resin solution is approximately I (Gardner-Holdt tube). The total time for this procedure, starting with the time when the diisocyanate is added to the kettle, is about 295 minutes. After the resin solution has been permitted to cool to room temperature, it is reduced to 30 percent by weight non-volatile content by the addition of a further quantity of a 1:1 by volume mixture of toluene and xylene. This final solution is useful as a laminating varnish.

EXAMPLE II 1018 grams of heptylphenol prepared as described in Example I and 127 grams of paraformaldehyde are charged to a two-liter glass flask equipped with resin apparatus. 55.2 grams of 37 percent by weight hydrochloric acid is then added to the reaction mixture by means of an addition funnel, following which 200 ml. of toluene is added. During a period of 20 minutes, the temperature of the reaction mixture is raised to 80° C., at which time an exothermic reaction is taking place. Heating is then discontinued for a period of 10 minutes in order to permit the exothermic reaction to subside, and 800 ml. of toluene is added. Following this, the reaction mixture is refluxed for a period of about 130 minutes in order to remove water from the reaction mixture. The reaction mixture is then permitted to cool, and is washed with water to render it neutral. The toluene solution is thereafter distilled under reduced pressure to a pot temperature of about 150° C.–160° C., thus providing a heptylphenol-formaldehyde-novolak resin.

To a three liter stainless steel kettle equipped with resin apparatus there is charged 174 grams of 2,4-tolylene diisocyanate together with 174 g. of toluene. Over a period of 25 minutes, the temperature of the mixture is raised to 118° C., and then over a period of 15 minutes there is added 136 grams of the heptylphenol-formaldehyde-novolak resin prepared as just described dissolved in 174 g. of toluene. The reaction mixture is then refluxed for 180 minutes, during which time the pot temperature is approximately 125–130° C. After this refluxing period, there is then added a further amount of 136 grams of the heptylphenol-formaldehyde novolak resin prepared as described dissolved in 136 g. of toluene, and refluxing is continued for 160 minutes at a pot temperature of about 130° C.–133° C. to produce a resin solution having a viscosity of U (Gardner-Holdt tube). The resin solution is then reduced by the addition thereto of toluene in amount sufficient to form a final solution containing 30 percent by weight of nonvolatiles. This final solution was suitable for use as a laminating varnish.

EXAMPLE III

This example illustrates the use of dinonylphenol as a chain stopper. The dinonylphenol is obtained by alkylating phenol with nonenes obtained by the fractionation of polymer gasoline and consists essentially of o,p-dinonyl phenol.

1.5 moles (330 grams) of nonylphenol prepared by alkylating phenol with nonenes fractionated from polymer gasoline, 0.5 mole (173 grams) of the dinonylphenol, 2.0 moles (63.2 grams) of paraformaldehyde, having a purity of 95 percent by weight, 17.9 grams of 37 percent by weight hydrochloric acid and 100 ml. of toluene, are charged to a two liter flask equipped with resin apparatus including a Dean-Stark trap. Over a period of 20 minutes, the temperature of the reaction mixture is gradually raised to 80° C., at which time an exothermic reaction commences. The heat is then turned off and during the next thirty-five minutes the temperature of the reaction mixture is maintained within the range from 80° C. to 96° C. Following this, 400 ml. of toluene is added and the temperature of the reaction mixture is raised to approximately 99° C. in order to remove the theoretical amount of water from the reaction mixture. This requires a period of 120 minutes, during which time nitrogen gas is blown through the reaction mixture and the temperature of the reaction mixture gradually rises to 117° C. The heating is then stopped, and the resin solution is then washed with water in order to neutralize it. Following this neutralization, the resin solution is vacuum distilled to a pot temperature of 160° C. at an absolute pressure of two centimeters of mercury in order to remove any water present and toluene. The resin is then poured from the flask and permitted to cool.

One mole (174 grams) of 2,4-tolylene diisocyanate and 174 g. of toluene are charged to a three-liter stainless steel kettle equipped with resin apparatus. Over a period of 30 minutes, the temperature of the solution is raised to 141° C., at which time over a period of 15 minutes there is added 267 grams of the nonylphenol-dinonylphenol-formaldehyde resin prepared as just described dissolved in 267 g. of toluene. The reaction mixture is then refluxed for a period of 120 minutes, following which 267 grams of the nonylphenol-dinonyl-formaldehyde novolak resin prepared as just described dissolved in 267 g. of xylene is added over a period of 15 minutes. After this had been done, the reaction mixture is refluxed for a period of about six hours, during which time the temperature of the reaction mixture is approximately 150° C. The viscosity of the reaction mixture is then G–H (Gardner-Holdt tube). By adding toluene to produce a mixture containing 30 percent by weight of nonvolatiles, there was produced a solution suitable for use as a laminating varnish.

EXAMPLE IV

A two-liter stainless steel kettle is charged with 102.0 grams of a solution of the heptylphenol-formaldehyde novolak prepared as described in Example I dissolved in 102 g. of toluene. Over a period of 40 minutes, the temperature of the solution is gradually raised to 90° C., and then 26.1 grams of 2,4-tolylene diisocyanate is added dropwise. After this has been done, the reaction mixture is refluxed until it has a viscosity of W (Gardner-Holdt tube). This requires a total time of approximately 350 minutes, starting with the time when the novolak resin solution is charged to the kettle. After the solution has been permitted to cool, it is reduced to 30 percent by weight non-volatile content by the addition of 1:1 by volume toluene:xylene.

EXAMPLE V

A heptylphenol-nonylphenol-formaldehyde novolak is prepared in the following manner:

0.85 mole (163.0 grams) of heptylphenol prepared as described in Example I, 0.15 mole (33.0 grams) of nonylphenol prepared as described in Example III, one mole (31.6 grams) of para-formaldehyde having a purity of 95 percent by weight, and 13.2 grams of 37 percent by weight hydrochloric acid are charged to a two liter glass flask equipped with resin apparatus. The reaction mixture is heated to approximately 75° C. during a period of 30 minutes, at which time the reaction becomes exothermic. The heating is then stopped and 75 ml. of toluene is added. When the exothermic reaction has subsided, which required a further period of about 20 minutes, 200 ml. of toluene is added, heating is commenced and a flow of nitrogen gas is introduced into the reaction mixture. After ten minutes, when the temperature of the reaction mixture has reached about 95° C., refluxing commences and water is trapped out of the condensed vapors from the reaction mixture. Refluxing with separation of water from the reaction mixture is continued for a period of 240 minutes, at which time the temperature of the reaction mixture is approximately 120° C. The heating and flow of nitrogen gas are then discontinued, and the resin solution remaining in the flask is water washed to remove acidity, and then separated. The resin solution is then vacuum distilled to a pot temperature of 150° C. at an absolute pressure of two centimeters of mercury in order to separate the toluene, following which the resin is poured from the distillation flask and permitted to cool. By this means there is produced a heptylphenol-nonylphenol-formaldehyde novolak having an average molecular weight of approximately 208.

One mole (174 grams) of 2,4-tolylene diisocyanate dissolved in 174 g. of 1:1 by volume toluene:xylene mixture is charged to a three liter stainless steel kettle equipped with resin apparatus, and over a period of 25 minutes the temperature of the reaction mixture is raised to 115° C. Following this, 208 grams of the heptylphenol-nonylphenol-formaldehyde novolak prepared as just described dissolved in 208 g. of a 1:1 by volume mixture of toluene and xylene is added over a period of 15 minutes at which time the temperature of the reaction mixture is raised to about 131° C. The reaction mixture is then maintained at that temperature for about 90 minutes. 208 grams of the heptylphenol-nonylphenol-formaldehyde novolak resin prepared as just described, dissolved in 208 g. of a 1:1 by volume mixture of toluene and xylene is then added over a period of approximately 15 minutes, following which the temperature of the reaction mixture is maintained at 130° C. for a period of 18 hours. After that time the viscosity of the mixture is G (Gardner-Holdt tube). In order to produce a laminating varnish, the resin solution is then diluted with sufficient 1:1 by volume toluene:xylene to produce a solution containing 30 percent by weight of non-volatiles.

EXAMPLE VI

In order to prepare a nonylphenol-formaldehyde novolak resin, nonenes prepared by the fractionation of polymer gasoline and phenol are reacted in the manner described in Example I to produce nonylphenol which is largely para-nonylphenol but which also contains a small amount of ortho-nonylphenol. One mole (220.0 grams) of the nonylphenol, 1.0 mole (31.6 grams) of paraformaldehyde of 95 percent by weight purity and 13.6 grams of 37 percent by weight hydrochloric acid are charged to a two-liter glass flask equipped with resin apparatus. Heat is applied until the temperature of the reaction mixture reaches 75° C., this taking about twenty minutes. The heat is turned off and 100 ml. of toluene is added. Then at the end of a further period of 10 minutes, the exothermic reaction having subsided in that time, the heat is again applied, a flow of nitrogen gas through the mixture is started, and a further quantity of 125 ml. of toluene is added. For 45 minutes, the temperature of the reaction mixture is approximately 98° C., at which point refluxing commences and water is collected in a Dean-Stark trap. The refluxing is continued for a further period of about 225 minutes, during which time the temperature of the reaction mixture gradually rises to 125° C. and the theoretical amount of water is collected in the trap. The heat and flow of nitrogen are then turned off, and the reaction mixture is permitted to cool to 50° C. It is then washed with water to neutrality and the resin solution is separated. Following this, the resin solution is vacuum distilled to a pot temperature of 150° C. at an absolute pressure of two centimeters of mercury to remove toluene, and the resin is poured from the flask and permitted to cool. The novolak has an average molecular weight of 232.

In order to prepare a nonylphenol-formaldehyde-diisocyanate laminating varnish from the novolak resin, 174 grams (1.0 mole) of a tolylene-diisocyanate mixture is charged to a three liter stainless steel resin kettle and is diluted with 174 g. of a 1:1 by volume mixture of toluene and xylene. The tolylene diisocyanate used is a mixture composed of approximately 80 percent by weight of 2,4-isomer and 20 percent by weight of the 2,6-isomer. The reaction mixture is then heated to a temperature of about 111° C. until it begins to reflux, this requiring about thirty minutes. 232.0 grams of the nonylphenol-formaldehyde novolak prepared as described dissolved in 232 g. of 1:1 by volume toluene:xylene is then added over a period of 15 minutes, during which time the temperature of the reaction mixture is raised to 133° C. Refluxing is continued at that temperature for a further period of 120 minutes at which time a further quantity of 232.0 grams of the nonylphenol-formaldehyde novolak dissolved in 232 g. of 1:1 by volume toluene:xylene is added. Refluxing is continued for a further period of 120 minutes at which time the viscosity is J (Gardner-Holdt tube). The reaction mixture is then permitted to cool, and reduced to 30 percent by weight nonvolatile content by the addition of 1:1 by volume toluene:xylene to produce a laminating varnish.

EXAMPLE VII

This example illustrates the use of diheptylphenol as a chain stopper.

Samples of monoheptylphenol and diheptylphenol are first prepared by alkylating phenol with mixed heptenes obtained by the fractionation of polymer gasoline using boron trifluoride etherate as the alkylation catalyst. In order to prepare a monoheptylphenol-diheptylphenol-formaldehyde novolak, 1.5 moles (288.0 grams) of the monoheptylphenol, 0.5 mole (145.0 grams) of the diheptylphenol, 2.0 moles of paraformaldehyde having a purity of 95 percent by weight (73.2 grams), 23.4 grams of 37 percent by weight hydrochloric acid and 125 ml. of toluene are charged to a two liter flask equipped with resin apparatus including a Dean-Stark trap. Over a period of thirty minutes, the temperature of the reaction mixture is gradually raised to 80° C., at which time an exothermic reaction commences. The heat is then turned off and during the next ten minutes the temperature of the reaction mixture is maintained within the range from 85° C. to 96° C. Following this, 370 ml. of toluene is added and the temperature of the reaction mixture is refluxed at approximately 99° C. in order to remove the theoretical amount of water from the reaction mixture. This requires a period of approximately 150 minutes, during which time nitrogen gas is blown through the reaction mixture and the temperature of the reaction mixture gradually rises to 117° C. The heating is then stopped, and the resin solution is washed with water in order to neutralize it. Following this neutralization, the resin solution is vacuum distilled to a pot temperature of 160° C. at an absolute pressure of two centimeters of mercury in order to remove any water present and toluene. The resin is then poured from the flask and permitted to cool.

One mole (174 grams) of 2,4-tolylene diisocyanate and an equal weight of xylene are charged to a three-liter stainless steel kettle equipped with resin apparatus. Over a period of 30 minutes, the temperature of the solution is raised to 127° C., at which time there is added 231 grams of the heptylphenol-diheptylphenol-formaldehyde novolak prepared as just described dissolved in 231 g. of toluene. The mixture is then refluxed for a period of 135 minutes. Following this, 231 grams of the heptylphenol-diheptylphenol-formaldehyde novolak prepared as just described dissolved in 231 g. of toluene is added over a period of 15 minutes. Refluxing is continued for approximately six hours when the viscosity (Gardner-Holdt tube) of the reaction mixture is G–H. By adding toluene to produce a mixture containing 30 percent by weight of non-volatiles, there is produced a solution suitable for use as a laminating varnish.

A series of tests was run in order to determine the stability of laminating varnishes containing various of the resins previously described. These varnishes had a 30 percent by weight non-voltatile content and the solvent present in the varnishes was a 1:1 by weight mixture of toluene and xylene. The varnishes were first prepared, and the viscosity of the varnishes was thereafter determined at various time intervals in order to determine viscosity change. The viscosities measured were Gardner-Holdt bubble tube viscosities taken at 77° F.

When the resin present in the varnish was the heptylphenol-formaldehyde-diisocyanate resin described in Example I, the initial viscosity of the varnish was less than A and it was still less than A nine days later. At the end of 14 days the viscosity of the varnish was D and at the end of 22 days a gel had formed.

When the resin used was the nonylphenol-formaldehyde-diisocyanate resin of Example VI, the initial viscosity of the laminating varnish was less than A and it was still less than A 6 months later. At the end of 7 months, the viscosity exceeded A and in 8 months and 10 days the viscosity of the varnish was between B and C. The varnish was thus an extremely stable one.

When the resin used was the heptylphenol-nonylphenol-formaldehyde-diisocyanate resin of Example V, the initial viscosity of the varnish was less than A and in two months and 3 days it was still less than A.

When the resin used was the heptylphenol-diheptylphenol-formaldehyde-diisocyanate resin of Example VII, the initial viscosity of the varnish was less than A and in one month and fourteen days it was still less than A. At the end of two months and eighteen days, the viscosity of the varnish was between B and C, and fourteen days later than this it was G. At the end of three months and twenty days a gel formed.

Using standard laminating techniques, a series of laminates was made using solutions of various resins of the preceding examples and also a commercial laminating resin. The bases used were electrical grade paper, kraft paper and glass cloth. Table I which follows sets forth the conditions under which the various laminates were made as well as test results on the laminates.

From the results set forth in the table, it will be noted

*Table I*

| No. | Base | Laminating resin in solution | Impregnation | Pre-cure | Cure | Laminate resin content, percent by weight | P.s.i. flexural modulus | P.s.i. flexural strength |
|---|---|---|---|---|---|---|---|---|
| 1 | Electrical grade paper. | Commercial | Hand dip two times | 10 min. 220–230° F. | 350° F. 50–100 p.s.i., 40 minutes. | 53.3 | 1.24×10⁶ | 22,350 |
| 2 | ___do___ | Example I | Hand dip one time | 20 min. 220° F. | 300° F. 5,000 p.s.i. 30 min.+ 350° F. 5,000 p.s.i. 30 min. | 51.8 | 1.31×10⁶ | 10,300 |
| 3 | Kraft paper | Example II | Vacuum | 30 min. 225° F. | 300° F. 1,500 p.s.i., 1 hour | 50.0 | 1.18×10⁶ | 23,900 |
| 4 | ___do___ | ___do___ | ___do___ | ___do___ | ___do___ | 50.0 | 1.09×10⁶ | 26,000 |
| 5 | ___do___ | Commercial | Hand dip two times | 10 min. 220° F. | 340° F. 125 p.s.i., 30 min. | 53.1 | 1.34×10⁶ | 22,900 |
| 6 | ___do___ | Example III | ___do___ | 5 min. 175° F. | 325° F. 500 p.s.i., 5 min., 2,500 p.s.i. 45 min. | 57.0 | 1.47×10⁶ | 10,780 |
| 7 | Glass cloth | Example IV | ___do___ | 10 min. 220° F. | 350° F. 100 p.s.i., 35 min. | 34.0 | 2.96×10⁶ | 49,300 |
| 8 | ___do___ | Example I | Hand dip three times | 30 min. 230° F. | 350° F. 100 p.s.i., 45 min. | 36.8 | 2.68×10⁶ | 45,000 |
| 9 | ___do___ | ___do___ | Hand dip two times | 40 min. 210° F. | 300° F. 250 p.s.i., 10 min. | 32.9 | 3.38×10⁶ | 69,300 |
| 10 | ___do___ | Commercial | ___do___ | 15 min. 220° F. | 350° F. 50–100 p.s.i., 40 min. | 34.2 | 3.0×10⁶ | 55,000 |

Note.—In Nos. 1 and 5, one percent by weight of hexamethylene tetramine, based upon the weight of the resin in the varnish was used as a catalyst. In No. 6, two percent by weight of triamylamine, based upon the weight of the resin in the varnish was used as a catalyst. In Nos. 2–4 and 7–10, no catalyst was used.

that from the standpoint of flexural strength the paper laminates prepared using the resins of this invention are in the range of those obtained with the commercial resin used as the control. The values below those obtained for the control are probably due to poor adhesion, resulting from variations in impregnation and lamination. The results of No. 7 and No. 9 compare favorably with standard data for the commercial control having similar resin content.

A further series of laminates was made and tested for water absorption using electrical grade paper and also using solutions of the resin of Example I, the resin of Example VI and a commercially available phenolic laminating resin. In making the laminates, the plies were first vacuum impregnated, then impregnated at atmospheric pressure, and then precured for 20 minutes at 220° F. in a circulating air oven in order to remove the solvent in which the resin was dissolved. Following this, the paper plies were laminated together in a curing step, and, at times, the laminates thus prepared were subjected to a post cure step.

Table II sets forth further information concerning the preparation and test results obtained with these laminates. In Table II, the regular cure involved heating for 45 minutes at 300° F. and at 1500 p.s.i. The gradual cure involved heating for 10 minutes at 225° F., 10 minutes at 250° F., 10 minutes at 275° F. and 15 minutes at 300° F., all at 1500 p.s.i. The kick-up cure involved heating for 15 minutes at 290° F. and for 30 minutes at 315° F., all at 1500 p.s.i. The regular post cure involved heating for 2 hours at 300° F. and 1500 p.s.i. The kick-up post cure involved heating for one hour at 325° F. and 1500 p.s.i. The oven post cure involved heating for 8 hours at 200° F., 8 hours at 250° F., and 8 hours at 300° F. all at atmospheric pressure. The recommended cure for the commercial resin involved heating for 45 minutes at 350° F. and 500 p.s.i.

The experimental results of Table II show that paper laminates made with the resins of the present invention are comparable from the standpoint of water absorption with those obtained using the commercial laminating resin.

TABLE II

| No. | Laminate resin used | Type cure | Type post cure | Laminate resin content percent by weight | Water absorp. after— | | 24 hr. percent thickness increase |
|---|---|---|---|---|---|---|---|
| | | | | | 2 hr. weight gain percent | 24 hrs. weight gain percent | |
| 1 | Example I | Regular | Regular | 52.3 | 0.62 | 2.31 | |
| 2 | do | do | do | 53.2 | 0.78 | 3.07 | |
| 3 | do | Gradual | do | 53.7 | 0.70 | 2.61 | |
| 4 | do | Kick-up | None | 54.8 | 0.55 | 2.98 | 2.35 |
| 5 | do | do | Regular | 54.8 | 0.61 | 2.19 | |
| 6 | do | do | Kick-up | 54.8 | 0.52 | 2.01 | |
| 7 | Commercial | Recommended | None | 53.3 | 1.02 | 3.99 | 2.71 |
| 8 | do | do | Oven | 53.3 | 0.99 | 3.87 | |
| 9 | do | do | Kick-up | 53.3 | 0.92 | 3.92 | |
| 10 | do | do | Regular | 53.3 | 1.07 | 3.92 | |
| 11 | Example VI | Regular | do | 51.2 | 0.67 | 2.39 | |
| 12 | do | do | None | 51.2 | 0.72 | 3.27 | 2.29 |

A further series of laminates was prepared using a laminating varnish containing the heptylphenol-formaldehyde-diisocyanate resin of Example I. The experimental conditions employed and the results obtained are set forth in Table III. In Table III, no curing catalyst was used in No. 1, whereas in Nos. 2, 3, 4 and 5 triamyl amine is employed as a curing catalyst in the amounts of 0.03, 0.03, 0.08 and 0.06 percent by weight, respectively, based upon the weight of the resin in the laminating solution.

Referring particularly to the experimental results set forth in Table III, the laminations prepared using the resins of the present invention have lower power factors at one megacycle than their maximum specification. The dielectric constant and loss for the laminates show values lower than those for standard types.

Good electrical data were obtained for the regular grade of kraft paper (No. 4) as well as from the electrical grade paper (alpha cellulose type). This has significance because heretofore laminates made with kraft paper have not been able to meet the standards set for laminates made with paper.

Still referring to Table III, it will be noted that the loss factors from the laminates prepared from varnishes containing the resins of this invention have loss factors which are lower than those of the standard types shown in the table. Thus, the dielectric constant, power factor and loss factor of the alkylphenol-formaldehyde-diisocyanate laminates are significantly lower than standard-type phenolic laminates. The lower the values for these properties, the better are the electrical (insulating) properties of the laminates.

*Table III*

| No. | Type of laminate | Pre-cure | Cure | Inch thickness | Laminate resin content percent by weight | Power factor 1 megacycle | Dielectric constant 1 megacycle | Loss factor 1 megacycle |
|---|---|---|---|---|---|---|---|---|
| 1 | Glass cloth | 10 min., 150° F. | 60 min., 350° F., 10,000 p.s.i. | 0.125 | 36.6 | 0.00654 | 3.83 | 0.025 |
| 2 | Electrical grade paper | 20 min., 200° F. | 60 min., 250°F., 10,000 p.s.i. | 0.198 | 58.2 | 0.0236 | 3.87 | 0 091 |
| 3 | do | 15 min., 200° F. | 60 min., 350° F., 10,000 p.s.i. | 0.190 | 59.3 | 0.0257 | 3.84 | 0.099 |
| 4 | Kraft paper | 10 min., 150° F. | do | 0.129 | 50.1 | 0.0242 | 3.46 | 0.084 |
| 5 | Electrical grade paper | 20 min., 200° F. | 60 min., 300° F., 10,500 p.s.i. | 0.170 | 52.7 | 0.0282 | 3.68 | 0.104 |
| REFERENCE DATA | | | | | | | | |
| XXXP ASTM D-150 | Paper base | | | [1] | [2] 50-60 | 0.030 to 0.035 | [3] 4.5 to 5.2 | 0.12 to 0.16 |
| G-2 NEMA LP 1-5.09 | Glass cloth | | | 0.125 | 32-37 | 0.08 | 5.8 | [2] 0.46 |

[1] All thicknesses.  [2] Approximately.  [3] Max. accept.

Table IV

| No. | Laminate thickness inch | 400 volts | 600 volts | Type base | Laminate resin content, percent by weight | Catalyst |
|---|---|---|---|---|---|---|
| 24 | 0.0821 | 5.53×10⁶ megohms at 50% relative humidity. | 6.7×10⁶ megohms at 50% relative humidity. | Electrical grade paper | 56.4 | |
| REFERENCE DATA | | | | | | |
| XXXP (NEMA) ASTM D-157 test. | 0.015 to 0.250 (range) | | 2.0×10⁴ megohms (no voltage rating). | Electrical grade paper | 50-60 | |
| Nylon base phenolic grade N-1 (NEMA) | 0.010 to 1.0 (max. range) | | 3×10⁴ to 1×10⁶ megohms (no voltage rating). | Nylon cloth base | | |
| Teflon laminate | | | 5000 to 10⁶ | Glass fabric base | | |
| Epoxy laminate | | | 1×10⁵ to 5.5×10⁵ | do | | |
| Silicone laminate | | | 1×10⁵ to 3×10⁵ | do | | |

Electrical grade paper (E.G.P.) was impregnated with a varnish containing the alkylphenol-formaldehyde-diisocyanate resin of Example V, and a laminate prepared using 0.06 percent by weight of triamylamine, based upon the weight of the resin in the varnish, as a curing catalyst. A precure of 10 minutes at 150° F. and atmospheric pressure and a cure of 60 minutes at 1000 p.s.i. and 300° F. was used. The resin content of the laminate was 56.4 percent by weight. The laminate was then tested in accordance with ASTM-D-257, with the exception that the laminate was not conditioned prior to the test, although it was run under the specified humidity and temperature control conditions.

The results of the insulation tests are set forth in Table IV, together with reference data. It will be noted that these data show values in excess of any of those given in the reference data of the table. The higher the value for the resistance, the better are the insulating properties of the laminate. The ASTM reference data does not specify the voltage under which the test was run, but the laminate prepared using the resin of Example V was run under 400 and 600 volts load test. The data obtained at those voltages were averages from several test runs.

In another series of tests, a series of laminates was prepared using kraft paper as the base material and using either a commercial phenolic insulating varnish or an insulating varnish containing the alkylphenol-formaldehyde-diisocyanate resin of Example I. In preparing the laminates using the commercial varnish, a precure at 230° F. and atmospheric pressure for 15 minutes and a cure at 350° F. and 2500 p.s.i. for 20 minutes and then at 350° F. and 10,000 p.s.i. for 45 minutes, all with standard hexamethylene tetramine catalyst, were employed. In preparing the laminates using the varnish containing the resin of Example I, a precure at 150° F. and atmospheric pressure for 15 minutes and a cure at 350° F. and 10,000 p.s.i. for 60 minutes were employed, 0.6 percent by weight of triamylamine, based on the weight of the resin, being present in the varnish.

The laminates were tested for dielectric strength according to ASTM D-149-55T (short time method) with the results shown in Table V. It will be noted that in no instance did a laminate made from the commercial varnish meet the XXXP standard, whole Nos. 5 and 7 made from the resin of Example I met with the standard despite the fact that kraft paper was used instead of the expensive alpha cellulose electrical grade paper. In No. 7 particularly, the standard was met with only 50.7% resin content. No. 4 and 6 did not meet the XXXP standard, and this was probably due to faulty fabrication.

Table V

| Laminate No. | Key to varnish | Weight percent resin in laminate | Laminate thickness, inch | Puncture voltage, volts | Dielectric strength volts/mil | Minimum standard paper base grade XXXP dielec. strength |
|---|---|---|---|---|---|---|
| 1 | Commercial | 61.5 | 0.0352 | 15,000 | 428 | ¹ 500 |
| 2 | do | 60.9 | 0.0230 | 12,000 | 521 | ² 700 |
| 3 | do | 60.5 | 0.0448 | 20,000 | 446 | ¹ 500 |
| 4 | Example I | 59.7 | 0.0498 | 22,000 | 443 | ¹ 500 |
| 5 | do | 63.2 | 0.0353 | 22,000 | 623 | ¹ 500 |
| 6 | do | 60.0 | 0.0268 | 17,000 | 634 | ² 700 |
| 7 | do | 50.7 | 0.0224 | 16,000 | 714 | ¹ 700 |

¹ Minimum standard in volts/mil for thickness of 0.0312 to 0.0625 inch.
² Minimum standard in volts/mil for thickness of 0.015 to 0.0312 inch.

What is claimed is:

1. A synthetic resin prepared by reacting a novolak prepared by reacting formaldehyde and, based on the moles of formaldehyde, from 0.75 to 1.5 moles of an alkyl phenol and, based on the moles of alkylphenol combined in said novolak, from 0.4 to 0.6 mole of an alkaryl diisocyanate to produce an aromatic hydrocarbon-soluble synthetic resin, said alkyl phenol being selected from the group consisting of nonylphenol, a mixture consisting essentially of about 15 mole percent of nonylphenol and about 85 mole percent of heptylphenol, and a mixture consisting essentially of about 25 mole percent of diheptylphenol and about 75 mole percent of heptylphenol prepared by the alkylation of phenol with an olefin separated from polymer gasoline selected from the group consisting of $C_7$ and $C_9$ olefins and said alkyl phenol being selected from the group consisting of monoalkyl phenols and mixtures thereof containing up to 35 mole percent of a dialkylphenol, based upon the weight of the monoalkylphenol and the dialkylphenol.

2. The composition of claim 1 wherein said alkyl phenol is a mixture consisting essentially of about 15 mole percent nonylphenol and about 85 mole percent of heptylphenol.

3. The composition of claim 1 wherein said alkylphenol is nonylphenol.

4. The composition of claim 1 wherein said diisocyanate is 2,4-tolylene diisocyanate.

5. The composition of claim 1 wherein said alkyl phenol is a mixture consisting essentially of about 15 mole percent nonylphenol and about 85 mole percent of heptylphenol and wherein said diisocyanate is 2,4-tolylene diisocyanate.

6. The composition of claim 1 wherein said alkylphenol is nonylphenol and wherein said diisocyanate is 2,4-tolylene diisocyanate.

7. A composition of matter suitable for use as an insulating varnish consisting essentially of a solution of the resin of claim 1 dissolved in a solvent selected from the group consisting of benzene and lower alkyl benzenes.

8. A composition of matter suitable for use as an insulating varnish consisting essentially of a solution of the resin of claim 2 dissolved in a solvent selected from the group consisting of benzene and lower alkyl benzenes.

9. A composition of matter suitable for use as an insulating varnish consisting essentially of a solution of the resin of claim 3 dissolved in a solvent selected from the group consisting of benzene and lower alkyl benzenes.

10. A composition of matter suitable for use as an insulating varnish consisting essentially of a solution of the resin of claim 4 dissolved in a solvent selected from the group consisting of benzene and lower alkyl benzenes.

11. A composition of matter suitable for use as an insulating varnish consisting essentially of a solution of the resin of claim 5 dissolved in a solvent selected from the group consisting of benzene and lower alkyl benzenes.

12. A composition of matter suitable for use as an insulating varnish consisting essentially of a solution of the resin of claim 6 dissolved in a solvent selected from the group consisting of benzene and lower alkyl benzenes.

13 A method for the production of a laminate which comprises impregnating plies of a base material with the composition of claim 7, removing the solvent, stacking the plies and thereafter curing the resin.

14. A method for the production of a laminate which comprises impregnating plies of a base material with the composition of claim 11, removing the solvent, stacking the plies and thereafter curing the resin.

15. A method for the production of a laminate which comprises impregnating plies of a base material with the composition of claim 12, removing the solvent, stacking the plies and thereafter curing the resin.

16. The method of claim 13 wherein said base material is kraft paper.

17. The composition of claim 1 wherein the alkaryl diisocyanate is an alkaryl diisocyanate wherein the alkaryl portion is selected from the group consisting of diphenylmethane, ditolylmethane, bitolylene and tolylene.

References Cited in the file of this patent

UNITED STATES PATENTS

| | | |
|---|---|---|
| 2,349,756 | Pratt | May 23, 1944 |
| 2,430,479 | Pratt et al. | Nov. 11, 1947 |
| 2,499,367 | De Groote et al. | Mar. 7, 1950 |

OTHER REFERENCES

Ellis: "The Chemistry of Synthetic Resins," volume 1, Reinhold Publishing Corp., 1935, page 412.